US010285160B2

(12) United States Patent
Kyeong et al.

(10) Patent No.: US 10,285,160 B2
(45) Date of Patent: May 7, 2019

(54) BROADCAST CHANNEL TRANSMITTING METHOD THROUGH MASSIVE MIMO IN WIRELESS COMMUNICATION SYSTEM AND APPARATUS THEREFOR

(71) Applicant: LG ELECTRONICS INC., Seoul (KR)

(72) Inventors: Soocheol Kyeong, Anyang-si (KR); Sungho Park, Anyang-si (KR); Kyunghaeng Lee, Anyang-si (KR); Hyunsoo Ko, Anyang-si (KR); Sunam Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 127 days.

(21) Appl. No.: 15/033,454

(22) PCT Filed: Dec. 17, 2013

(86) PCT No.: PCT/KR2013/011731
§ 371 (c)(1),
(2) Date: Apr. 29, 2016

(87) PCT Pub. No.: WO2015/064832
PCT Pub. Date: May 7, 2015

(65) Prior Publication Data
US 2016/0255605 A1 Sep. 1, 2016

Related U.S. Application Data

(60) Provisional application No. 61/898,429, filed on Oct. 31, 2013.

(51) Int. Cl.
H04B 7/06 (2006.01)
H04H 20/72 (2008.01)
(Continued)

(52) U.S. Cl.
CPC ........ *H04W 72/005* (2013.01); *H04B 7/0413* (2013.01); *H04B 7/0617* (2013.01);
(Continued)

(58) Field of Classification Search
None
See application file for complete search history.

(56) References Cited

U.S. PATENT DOCUMENTS 5,321,849 A * 6/1994 Lemson ............... H03G 3/3052
398/209
6,473,616 B1 * 10/2002 Sydor .................... H01Q 1/246
455/25
(Continued)

FOREIGN PATENT DOCUMENTS

| JP | 2012044408 | 3/2012 |
| KR | 1020080027819 | 3/2008 |
| KR | 1020080089522 | 10/2008 |

OTHER PUBLICATIONS

PCT International Application No. PCT/KR2013/011731, Written Opinion of the International Searching Authority dated Jul. 31, 2014, 18 pages.

*Primary Examiner* — Noel R Beharry
*Assistant Examiner* — Rodrick Mak
(74) *Attorney, Agent, or Firm* — Lee Hong Degerman Kang Waimey

(57) ABSTRACT

The present application discloses a method for transmitting, by a base station, a broadcast channel through a massive multiple-input multiple output (MIMO) antenna in a wireless communication system. Specifically, the method comprises the steps of: selecting broadcast channel dedicated antenna elements from among all antenna elements of the massive MIMO antenna; and transmitting the broadcast channel by performing a beamforming using the broadcast channel dedicated antenna elements. In the present inven- (Continued)

tion, the power applied to the broadcast channel dedicated antenna elements in greater than the voltage applied to the remaining antenna elements.

12 Claims, 9 Drawing Sheets

(51) Int. Cl.
  *H04W 72/00* (2009.01)
  *H04W 72/04* (2009.01)
  *H04B 7/0413* (2017.01)

(52) U.S. Cl.
  CPC ........... *H04B 7/0691* (2013.01); *H04H 20/72* (2013.01); *H04W 72/046* (2013.01)

(56) References Cited

U.S. PATENT DOCUMENTS

| | | | |
|---|---|---|---|
| 2006/0098754 A1 | 5/2006 | Kim et al. | |
| 2008/0026697 A1 | 1/2008 | Signell et al. | |
| 2008/0207238 A1* | 8/2008 | Tosato | H04B 7/04 455/507 |
| 2010/0329401 A1* | 12/2010 | Terry | H04L 27/2615 375/346 |
| 2012/0008707 A1* | 1/2012 | Kim | H04B 7/063 375/295 |
| 2012/0046001 A1 | 2/2012 | Inque et al. | |
| 2012/0307928 A1* | 12/2012 | Jia | H04B 7/0667 375/267 |
| 2013/0083832 A1* | 4/2013 | Sorensen | G01S 3/805 375/224 |
| 2016/0269092 A1* | 9/2016 | Wich | H04B 7/0408 |
| 2017/0294943 A1* | 10/2017 | Shen | H04B 7/06 |

* cited by examiner (A) CONTROL-PLANE PROTOCOL STACK (B) USER-PLANE PROTOCOL STACK (a) CONVENTIONAL ANTENNA SYSTEM    (b) AAS (a)          (b)          (c)

BROADCAST CHANNEL TRANSMITTING METHOD THROUGH MASSIVE MIMO IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2013/011731, filed on Dec. 17, 2013, which claims the benefit of U.S. Provisional Application No. 61/898,429, filed on Oct. 31, 2013, the contents of which are all hereby incorporated by reference herein in their entirety.

TECHNICAL FIELD

The present invention relates to a wireless communication system, and more particularly, to a method of transmitting a broadcast channel through a massive MIMO in a wireless communication system and an apparatus therefor.

BACKGROUND ART

3GPP LTE (3rd generation partnership projecting long term evolution) communication system is schematically described for one example of a wireless communication system to which the present invention is applicable.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '3rd Generation Partnership Project: Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

DISCLOSURE OF THE INVENTION

Technical Task

Based on the aforementioned discussion, a method of transmitting a broadcast channel through a massive MIMO in a wireless communication system and an apparatus therefor are proposed in the following.

Technical Solution

To achieve these and other advantages and in accordance with the purpose of the present invention, as embodied and broadly described, according to one embodiment, a method of transmitting a broadcast channel, which is transmitted by a base station through a massive MIMO (multiple-input multiple-output) antenna in a wireless communication system, includes the steps of selecting broadcast channel-dedicated antenna elements from among the whole of antenna elements of the massive MIMO antenna and transmitting the broadcast channel by performing beamforming using the broadcast channel-dedicated antenna elements. In this case, power supplied to the broadcast channel-dedicated antenna elements can be greater than power supplied to the remaining antenna elements.

In this case, if the broadcast channel-dedicated antenna elements are vertically grouped among the whole of the antenna elements, the broadcast channel transmitting step can include the step of transmitting the broadcast channel by performing beamforming in up and down direction. In particular, the beamforming in up and down direction can change a beam angle stage by stage in up and down direction for a prescribed period.

And, the broadcast channel-dedicated antenna elements can be horizontally grouped among the whole of the antenna elements. In this case, the broadcast channel transmitting step can include the step of transmitting the broadcast channel by performing beamforming in left and right direction. Of course, the beamforming in left and right direction can change a beam angle stage by stage in left and right direction for a prescribed period.

Preferably, the broadcast channel-dedicated antenna elements can include a first broadcast channel-dedicated antenna group which is vertically grouped among the whole of the antenna elements and a second broadcast channel-dedicated antenna group which is horizontally grouped among the whole of the antenna elements. In this case, an antenna group for transmitting the broadcast channel can periodically use the first broadcast channel-dedicated antenna group and the second broadcast channel-dedicated antenna group.

To further achieve these and other advantages and in accordance with the purpose of the present invention, according to a different embodiment, a transmitter in a wireless communication system can include a wireless communication module including a massive MIMO (multiple-input multiple-output) antenna and a processor configured to control the wireless communication module to select broadcast channel-dedicated antenna elements from among the whole of antenna elements of the massive MIMO antenna and transmit the broadcast channel by performing beamforming using the broadcast channel-dedicated antenna elements, the processor configured to control power supplied to the broadcast channel-dedicated antenna elements to be greater than power supplied to the remaining antenna elements.

In this case, if the broadcast channel-dedicated antenna elements are vertically grouped among the whole of the antenna elements, the processor can control the wireless communication module to transmit the broadcast channel by performing beamforming in up and down direction. Or, if the broadcast channel-dedicated antenna elements are horizontally grouped among the whole of the antenna elements, the processor can control the wireless communication module to transmit the broadcast channel by performing beamforming in left and right direction.

Preferably, the broadcast channel-dedicated antenna elements can include a first broadcast channel-dedicated antenna group which is vertically grouped among the whole of the antenna elements and a second broadcast channel-dedicated antenna group which is horizontally grouped among the whole of the antenna elements. In this case, the processor can periodically use the first broadcast channel-dedicated antenna group and the second broadcast channel-dedicated antenna group as an antenna group for transmitting the broadcast channel.

Advantageous Effects

According to embodiments of the present invention, it is able to efficiently transmit a broadcast channel through a massive antenna array in a wireless communication system.

Effects obtainable from the present invention may be non-limited by the above mentioned effect. And, other unmentioned effects can be clearly understood from the following description by those having ordinary skill in the technical field to which the present invention pertains.

BEST MODE

Mode for Invention

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Hybrid FDD or Time Division Duplexing (TDD) with some modifications.

Now a description will be given of a MIMO system. MIMO can increase the transmission and reception efficiency of data by using a plurality of Transmission (Tx) antennas and a plurality of Reception (Rx) antennas. That is, with the use of multiple antennas at a transmitter or a receiver, MIMO can increase capacity and improve performance in a wireless communication system. The term "MIMO" is interchangeable with 'multi-antenna'.

The MIMO technology does not depend on a single antenna path to receive a whole message. Rather, it completes the message by combining data fragments received through a plurality of antennas. MIMO can increase data rate within a cell area of a predetermined size or extend system coverage at a given data rate. In addition, MIMO can find its use in a wide range including mobile terminals, relays, etc. MIMO can overcome a limited transmission capacity encountered with the conventional single-antenna technology in mobile communication.

Figure 1:
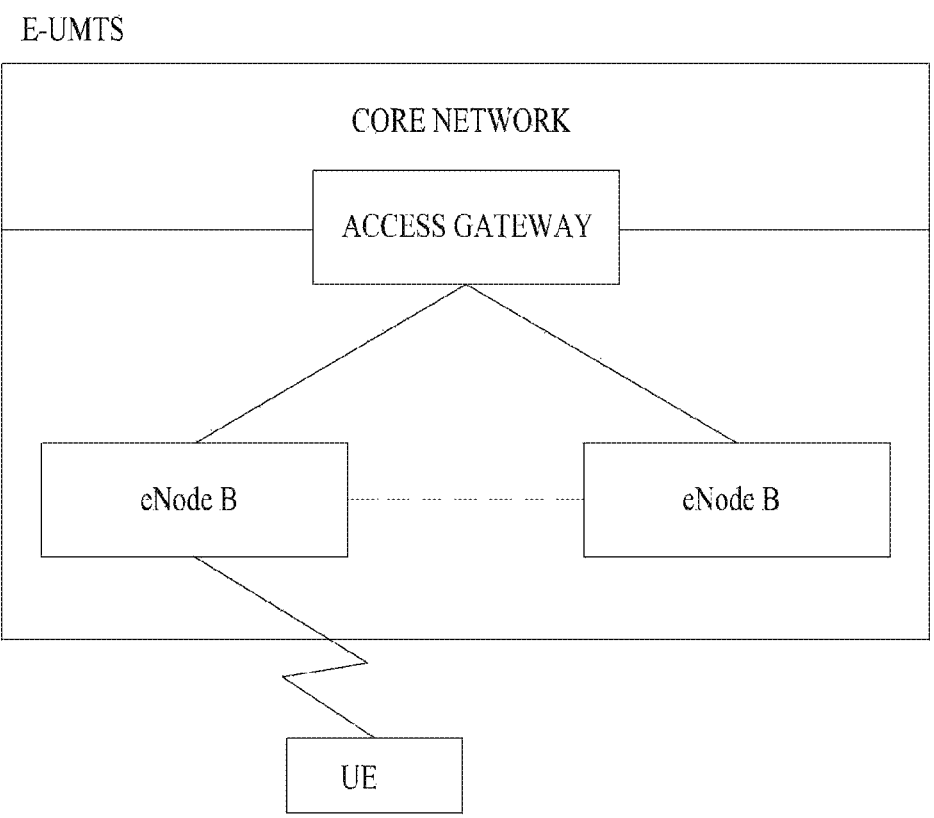
FIG. 1 illustrates a configuration of an Evolved Universal Mobile Telecommunications System (E-UMTS) network as an example of a wireless communication system.
Figure 2:
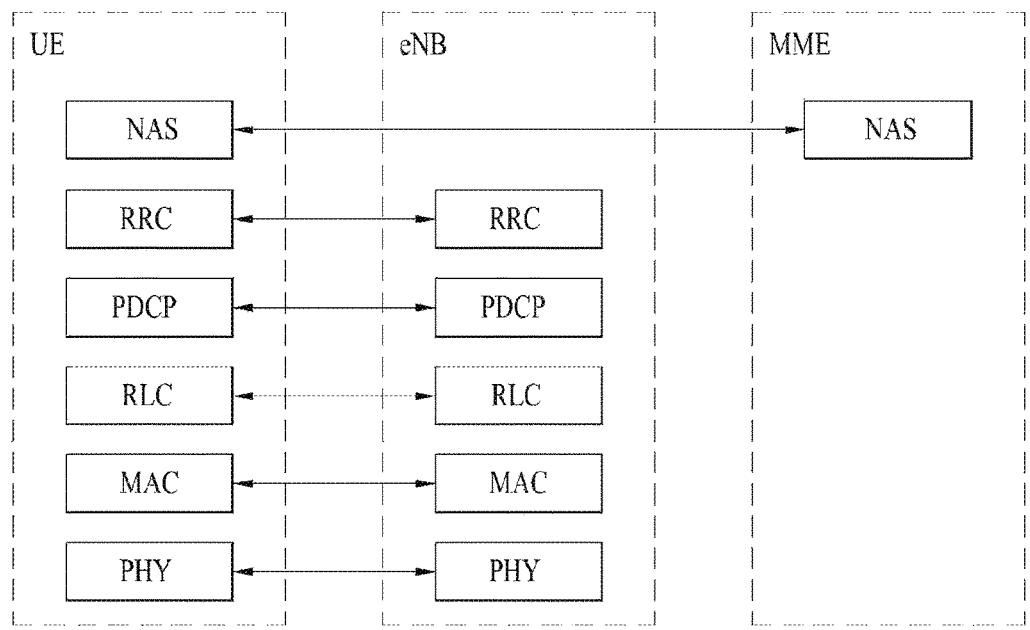
FIG. 2 illustrates a configuration of a general Multiple Input Multiple Output (MIMO) communication system.
Figure 2:
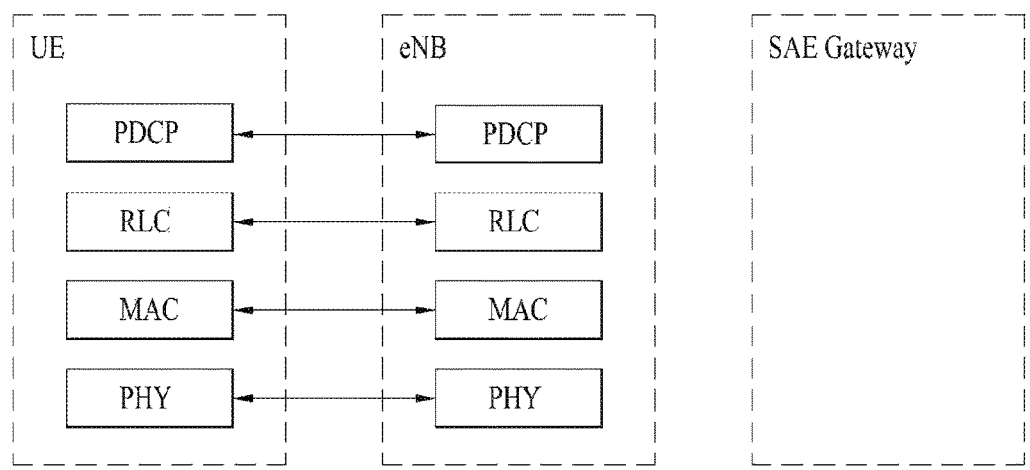

FIG. 2 illustrates the configuration of a typical MIMO communication system. Referring to FIG. 2, a transmitter has $N_T$ Tx antennas and a receiver has $N_R$ Rx antennas. The use of a plurality of antennas at both the transmitter and the receiver increases a theoretical channel transmission capacity, compared to the use of a plurality of antennas at only one of the transmitter and the receiver. The channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas. $R_i$ is the smaller value between $N_T$ and $N_R$.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards such as standards for 3G mobile communications, future-generation Wireless Local Area Network (WLAN), etc.

Concerning the research trend of MIMO up to now, active studies are underway in many aspects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with $N_T$ Tx antennas and $N_R$ Rx antennas as illustrated in FIG. 2 will be described in detail through mathematical modeling. Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals are $x_1, x_2, \ldots, x_{N_T}$ are represented as a vector X, which may be determined by [Equation 5]. Herein, $w_{ij}$ denotes a weight between a $j^{th}$ piece of information and an $i^{th}$ Tx antenna and W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In general, the rank of a channel matrix is the maximum number of different pieces of information that can be transmitted on a given channel, in its physical meaning. Therefore, the rank of a channel matrix is defined as the smaller between the number of independent rows and the number of independent columns in the channel matrix. The rank of the channel matrix is not larger than the number of rows or columns of the channel matrix. The rank of a channel matrix H, rank(H) satisfies the following constraint.

$$\text{rank}(H) \leq \min(N_T, N_R) \quad \text{[Equation 6]}$$

A different piece of information transmitted in MIMO is referred to as 'transmission stream' or shortly 'stream'. The 'stream' may also be called 'layer'. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \quad \text{[Equation 7]}$$

"# of streams" denotes the number of streams. One thing to be noted herein is that one stream may be transmitted through one or more antennas.

One or more streams may be mapped to a plurality of antennas in many ways. The stream-to-antenna mapping may be described as follows depending on MIMO schemes. If one stream is transmitted through a plurality of antennas, this may be regarded as spatial diversity. When a plurality of streams are transmitted through a plurality of antennas, this may be spatial multiplexing. Needless to say, a hybrid scheme of spatial diversity and spatial multiplexing in combination may be contemplated.

Figure 3:
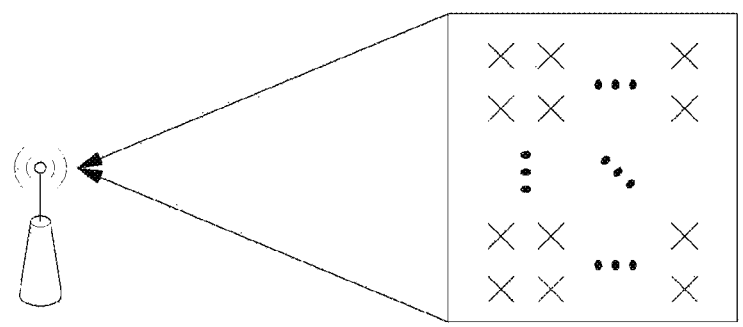
FIG. 3 illustrates an antenna form for a massive MIMO.

In the following, a massive MIMO is explained. FIG. 3 illustrates an antenna form for a massive MIMO.

Referring to FIG. 3, a massive MIMO corresponds to a form that more antennas are aggregated with each other compared to a legacy antenna array. According to the massive MIMO, more than hundreds of antennas installed in a base station are arranged in a space to gain a directional radiation pattern and a pencil beamforming and obtain capability identical to capability of single big antenna using many small antennas installed in a single array. When a plurality of antennas (e.g., hundreds of antennas) are aggregated with each other, a mechanical problem occurring in a single big antenna can be solved by an electrical matter for feeding power to a small antenna.

In general, an antenna form or an antenna array structure of a legacy base station/UE uses a ULA (uniform linear array) scheme. According to the ULA scheme, a space between an antenna and each element having an identical resonant frequency is constantly maintained and a form of arranging a linear array structure has been used. In general, an array includes regularly arranged identical elements and has a structure of deploying a plurality of antennas to a prescribed space to gain a directional radiation pattern and accessing a plurality of the antennas with each other.

Capability of an antenna array is determined by an operational characteristic and a type of a single antenna element constructing the antenna array. A working band and a characteristic of an antenna array are determined according to a resonant frequency on which a single antenna element is operating, current distribution and a radiation pattern. In particular, as shown in equation 8 in the following, a characteristic of an antenna array is determined by a characteristic of an element, the number of antenna arrays and a space between antennas.

$$E_t = \hat{a}_\theta j\eta \frac{kI_0 l e^{-jkr}}{4\pi r} \cos\theta \{1 + e^{j(kd\cos\theta+\beta)}\} \quad \text{[Equation 8]}$$

$$= \hat{a}_\theta j\eta \underbrace{\frac{kI_0 l e^{-jkr}}{4\pi r} \cos\theta}_{\text{Element Factor}} \cdot \underbrace{2e^{j(kd\cos\theta+\beta)/2} \cos\left[\frac{1}{2}(kd\cos\theta+\beta)\right]}_{\text{Array Factor}}$$

And, as shown in equation 9 in the following, an electric field of a uniform array consisting of a plurality of identical elements can be obtained by multiplying an electric field of a unit element located at square one by an AF (array factor).

$$AF = 1 + e^{+j(kd\cos\theta+\beta)} + e^{+j2(kd\cos\theta+\beta)} + \ldots + \quad \text{[Equation 9]}$$
$$e^{+j(N-1)(kd\cos\theta+\beta)}$$
$$= \sum_{n=1}^{N} e^{j(n-1)(kd\cos\theta+\beta)}$$

In particular, a massive MIMO may correspond to a structure that legacy antenna arrays are aggregated with each other. An electric field formed by the massive MIMO is dependent on a unit antenna and the number of antennas. And, a radiation pattern of an antenna array is determined according to a shape of each antenna element, a direction of each antenna element, a position in a space, and size and phase of feeding current. A width of a radiated beam is dependent on the number of antennas. As the number of antennas increases, beam steering and a beamwidth are getting more accurate. Hence, as the huge number of antennas including an identical shape and characteristic are used, a beamforming becomes more accurate. A beam including a very narrow beamwidth is referred to as a pencil beam. Since a massive MIMO has an antenna array structure, a phase is basically multiplied on the basis of a specific target to deliver a signal. In this case, as shown in equation 8, a value of a phase constantly increases according to an antenna port and it is able to steer a beam to a direction at which the specific target is positioned. In a legacy cellular system, a base station UE uses an antenna of a ULA structure. The ULA structure corresponds to a structure of using a plurality of antennas including an identical characteristic to have an identical radiation beam pattern in all mobile communication service bands.

In the following, an active antenna system (AAS) and 3 dimensional beamforming are explained.

According to a legacy cellular system, a base station reduces inter-cell interference and uses a method of enhancing throughput of user equipments in a cell (e.g., SINR (signal to interference plus noise ratio)) using a mechanical tilting or an electrical tilting. Regarding this, it shall be explained in more detail with reference to a drawing.

Figure 4:
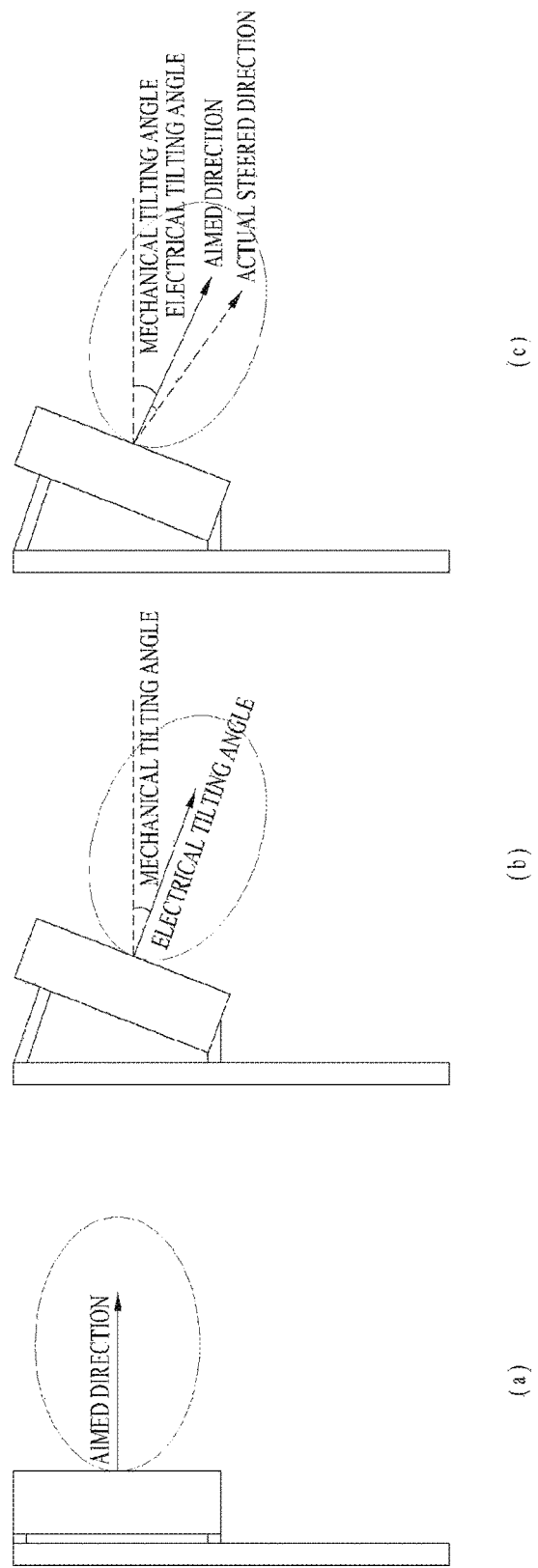
FIG. 4 is a diagram for explaining an antenna tilting scheme.

FIG. 4 is a diagram for explaining an antenna titling scheme. In particular, FIG. 4 (a) shows an antenna structure to which an antenna tilting is not applied, FIG. 4(b) shows an antenna structure to which a mechanical tilting is applied and FIG. 4(c) shows an antenna structure to which both the mechanical tilting and the electrical tilting are applied.

When FIG. 4(a) and FIG. 4(b) are compared with each other, in case of the mechanical tilting, as shown in FIG. 4(b), there is a demerit in that a beam direction is fixed when the mechanical titling is initially installed. Moreover, in case of the electrical titling, as shown in FIG. 4(c), although a tilting angle is modifiable using an internal phase shift module, there in a demerit in that it is able to perform very limitative vertical beamforming (vertical beamforming) only due to an actual cell-fixed tilting.

Figure 5:
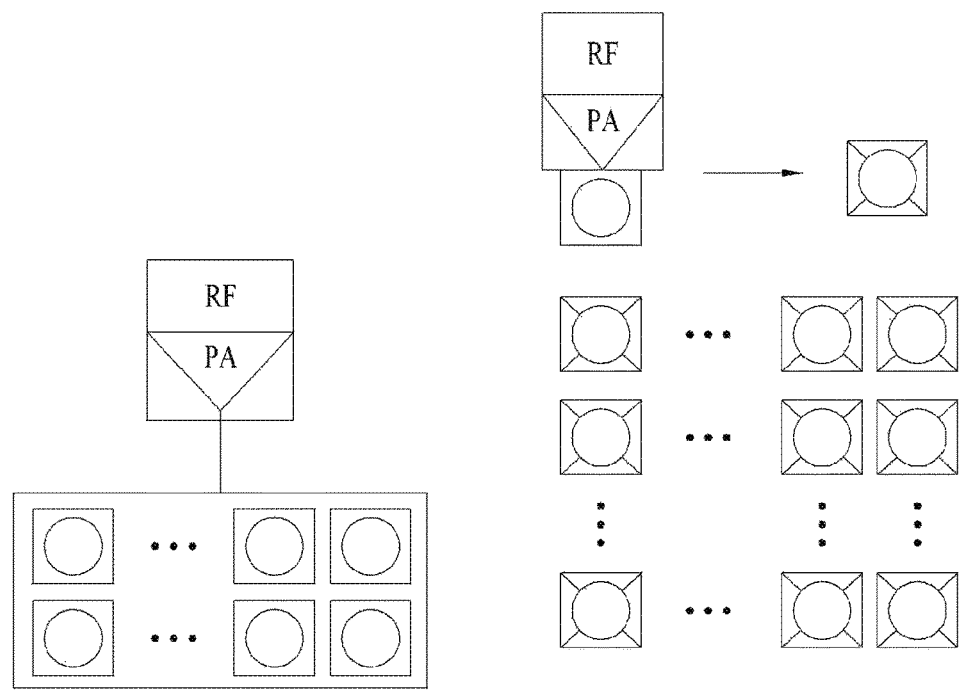
FIG. 5 is a diagram for comparing a conventional antenna system and an active antenna system with each other.

FIG. 5 is a diagram for comparing a conventional antenna system and an active antenna system (AAS) with each other. In particular, FIG. 5(a) shows the conventional antenna system and FIG. 5(b) shows the active antenna system.

Referring to FIG. 5, unlike a conventional antenna system, an active antenna system corresponds to a system that each of a plurality of antenna modules includes a power amplifier and an RF module, i.e., an active element. Hence, the active antenna system can control power and a phase of each of a plurality of the antenna modules.

In general, a MIMO antenna structure considers a linear, i.e., one dimensional array antenna such as a ULA (uniform linear array). In one dimensional array structure, a beam capable of being generated by beamforming exists in a two-dimensional plane. This can also be applied to a passive antenna system (PAS)-based MIMO structure of a legacy base station. Although vertical antennas and horizontal antennas exist in a PAS-based base station, since the vertical antennas are bound by a single RF module, it is difficult to perform beamforming in vertical direction. Hence, it is able to apply the aforementioned mechanical tilting only.

Yet, as an antenna structure of a base station is evolved to an active antenna system, an independent RF module is also implemented in vertical direction antennas. Hence, beamforming is enabled not only in horizontal direction but also in vertical direction. This is called elevation beamforming.

According to the elevation beamforming, since beams capable of being generated are able to be represented in a 3 dimensional space in vertical and horizontal direction, this may be referred to as 3 dimensional beamforming. In particular, the 3 dimensional beamforming is enabled in a manner that one dimensional array antenna structure is evolved to a two dimensional array antenna structure of a plane form. In this case, the 3 dimensional beamforming can be performed not only in a planar form of an antenna array but also in an array structure of a ring form. The 3 dimensional beamforming has a characteristic in that a MIMO process is performed in a 3 dimensional space due to an antenna arrangement of various forms instead of a conventional 1 dimensional array antenna structure.

Figure 6:
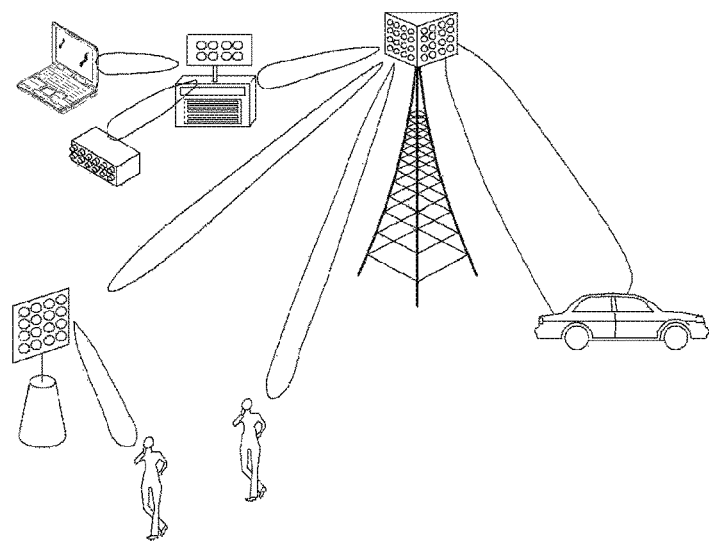
FIG. 6 is a diagram for an example of forming a UE-specific beam based on an active antenna system.

FIG. 6 is a diagram for an example of forming a UE-specific beam based on an active antenna system. Referring to FIG. 6, with the help of 3 dimensional beamforming, although a user equipment moves back and forth of a base station and left and right of the base station, it is able to perform beamforming. Hence, it is able to more freely form a UE-specific beam.

Moreover, transmission environment using an antenna structure of a two dimensional array based on an active antenna may include environment of transmitting to an outdoor UE by an outdoor base station, environment (O2I, outdoor to indoor) of transmitting to an indoor UE by an outdoor base station and environment (indoor hotspot) of transmitting to an indoor UE by an indoor base station and the like.

In case of considering actual cell environment, it is necessary to reflect a channel characteristic different from conventional radio channel environment, for example, a change of a shadow/path loss according to a height difference, a change of a fading characteristic and the like for the transmission environment using an active antenna-based 2 dimensional antenna array. In particular, if transmission is performed using a minute beam such as pencil beamforming, 3D beamforming may be useful or may be not useful depending on a UE position. And, if a beam becomes minute like pencil beamforming, since coverage of a base station becomes physically narrow, a huge shadow zone may occur.

As mentioned in the foregoing description, it is getting more difficult for a UE to estimate information on a channel characteristic, channel link complexity between a UE and a base station increases and calculation complexity of the UE increases according to a radiation form of the base station. In particular, if an array scale increase as much as a massive MIMO for minute beam steering, it may increase a shadow zone of a base station as well as calculation complexity of a UE, an amount of feedback information, and implementation complexity. Moreover, since the number of antenna ports which is selected to receive a broadcast channel is limitative, power loss may occur in an active antenna system. And, since beam gain and cell coverage are decreased due to the not sufficient number of antennas, a broadcast channel is unable to reach a cell boundary area.

Therefore, the present invention proposes a technology of overcoming cell coverage decreased by a selected antenna port in a manner of increasing a dynamic range of a PAM of an RF module connected with the antenna port, which is selected to transmit a broadcast channel, more than an output range of an RF module used by a different antenna port.

As mentioned in the foregoing description, due to the development of the active antenna system, a base station is able to perform 3D beamforming. As massive MIMO environment is formed in the base station, a form of a radiated beam becomes more delicate in proportion to the increase of the number of antennas.

Figure 7:
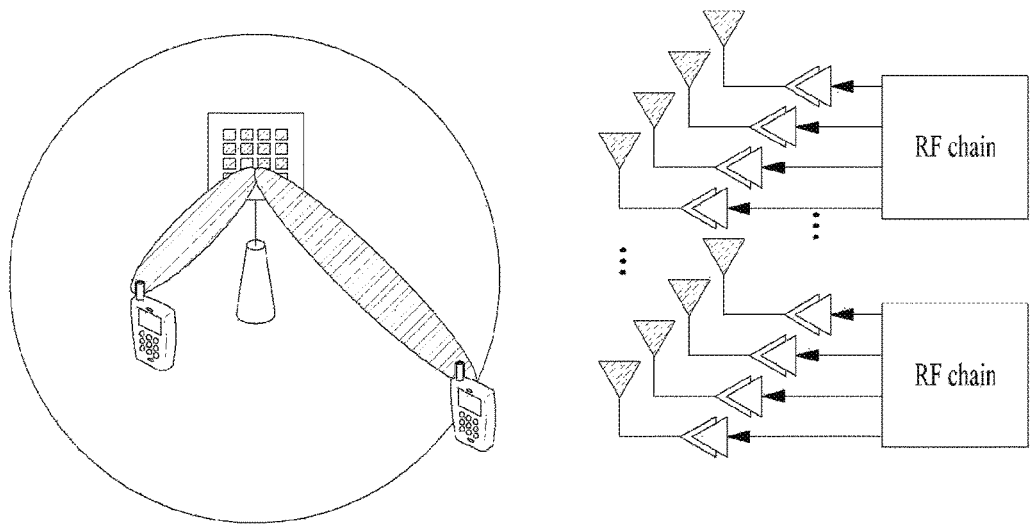
FIG. 7 is a diagram for an example of an active antenna system applied to massive MIMO environment.

FIG. 7 is a diagram for an example of an active antenna system applied to massive MIMO environment. In particular, FIG. 7 shows an example of an operation of a base station capable of performing 3D beamforming as the active antenna system is introduced to the massive MIMO environment.

As the 3D beamforming is enabled due to the introduction of the active antenna system, elevation beamforming/horizontal beamforming can also be enabled. A base station can minimize inter-cell interference by controlling a transmission range in a cell through the elevation beamforming. In particular, since it is able to tilt a beam in vertical direction, it is able to overcome ICI (inter cell interference, intra cell interference) occurring at the boundary between cells. Moreover, since it is able to adjust a beamwidth of a beamforming, a base station/user equipment is able to efficiently form a link and transmit and receive data in a situation that a beamforming is not available, e.g., a situation that LOS (line of sight) is not secured. Hence, it is able to overcome a shadow zone, which occurs when a minute 3D beam is used, and expand 3D beam coverage.

In the following, a method of expanding broadcast channel coverage using an active antenna system in massive MIMO environment is proposed.

Figure 8:
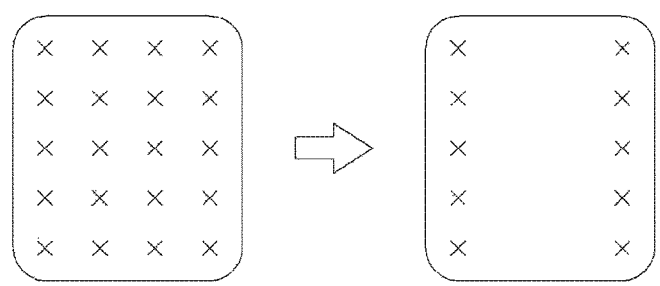
FIG. 8 is a diagram for an example of a method of varying a beamwidth for a broadcast channel according to embodiment of the present invention.

FIG. 8 is a diagram for an example of a method of varying a beamwidth for a broadcast channel according to embodiment of the present invention. In particular, according to FIG. 8, in order to adjust a beamwidth using an active antenna system, a beamwidth of a radiation pattern formed by a base station antenna can be adjusted in a manner of tuning on/off power supplied to an antenna port. In particular, the beamwidth may vary in a manner of artificially decreasing the number of antennas using a characteristic of the active antenna system.

In the present invention, an active antenna system is used to adjust a 3D beam in massive MIMO environment and the number of antennas is selectively controlled using a scheme of controlling whether to supply power. By doing so, a shape of a radiation beam formed by a base station can be adjusted. Yet, since the number of actually operating antennas is decreased, there exist demerits in that antenna beam gain is decreased and beam coverage is changing.

Figure 9:
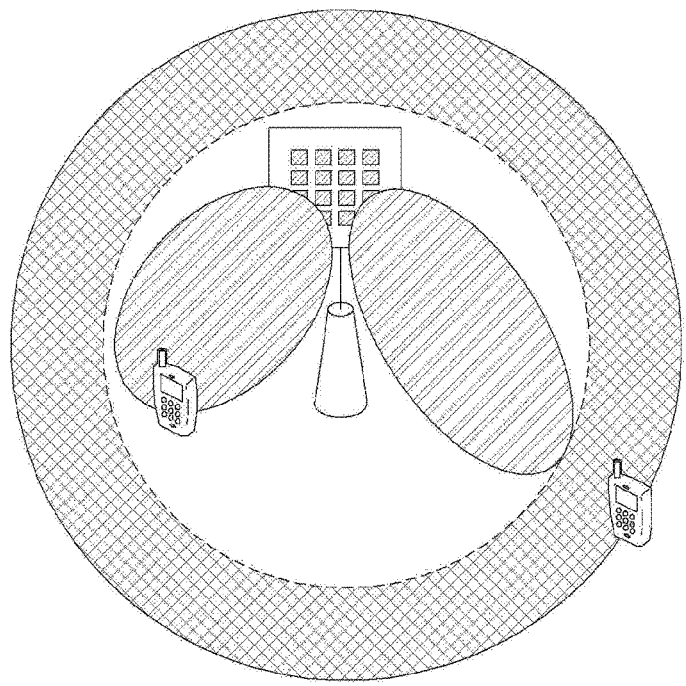
FIG. 9 is a diagram for an example of a problem capable of being occurred when a broadcast channel is transmitted using a prescribed antenna only.

FIG. 9 is a diagram for an example of a problem capable of being occurred when a broadcast channel is transmitted using a prescribed antenna only.

Referring to FIG. 9, in case of using an antenna selected to transmit a broadcast channel only, since beam gain is decreased and beam coverage becomes smaller, it is able to see that a shadow zone incapable of receiving a signal at the cell boundary becomes bigger. Since an RF structure of an active antenna system connected to each antenna port is an identical structure and PAM of an RF module consists of an identical element, a dynamic range is limitative. Hence, power outputted from an antenna is decreased and power received at a receiving end is lowered. Hence, a shadow zone is increasing. This can be explained by a theoretical approach shown in equation 10 in the following.

$$EIRP = P_t \times G_a \quad \text{[Equation 10]}$$

$$P = \frac{P_t}{4\pi D^2}$$

$$A = \frac{1.64\lambda^2}{4\pi}$$

$$P_{Rx} = P \times A$$

In equation 10, EIRP corresponds a value indicating an effective transmission output in consideration of an effectiveness of an antenna gain as a concept of effective power of a wireless device. $P_t$ corresponds to transmitter output power outputted from an antenna and $G_a$ corresponds to an antenna gain. If it is assumed as the antenna gain is constant, it may indicate that power outputted from a transmitting end is proportional to the number of antennas.

For example, in massive MIMO to which an active antenna system of 100 Tx is applied, a size of the $P_t$ is determined by a dynamic range of an amplifier. Yet, in case of the small number of antennas (e.g., 10 antennas) which are selected to transmit a broadcast channel such as a CRS port, since the antennas have $P_t$ less than whole $P_t$ of the massive MIMO as much as 10 times, EIRP has a value which is smaller as much as 10 dB. If decreasing cell coverage is calculated using equation 10, it is able to calculate cell coverage which is decreased as much as 10 times. This may indicate that transmission output formed in an actual antenna is decreased. Since the transmission output is decreased, it may also indicate that sufficient power is not delivered at the cell boundary.

3D beamforming is a structure optimized for LOS environment. If the number of antennas is considerably increasing, a HPBW (half-power beamwidth) may become very narrow. Hence, it enables not only high transmission speed but also low transmit power transmission. Yet, there may also exist demerits in that it is difficult to obtain synchronization between a base station and a user equipment, a beam titling angle is not accurate, channel complexity increases due to a movement of a user equipment, cell coverage decreases due to interference and the like. Moreover, due to a difference in a configuration and a size of an antenna array and/or a difference in a location and an altitude, there may exist a difference in an elevation beam control range or a communication link may not be formed between a base station and a user equipment.

If a base station uses an active antenna system structure including an identical PAM shown in FIG. 9 to transmit a broadcast channel, although a beam pattern for delivering broadcast channel information is formed, cell coverage becomes smaller and output power is decreased. Hence, a user equipment positioned at the cell boundary may fall into a null state or may be difficult to have environment for communicating with a base station.

Hence, the present invention proposes that a base station uses a PAM of which a dynamic range is different from each other according to a prescribed selected antenna to expand coverage of a broad beam formed by 3D beam.

Specifically, in case of a legacy active antenna system, power, which is supplied to all antenna ports, uses a PAM having an identical dynamic range for each of the antenna ports and a minute beamwidth is formed by constantly maintaining a 3D beam formed on an antenna using a scheme of increasing or decreasing output power in a dynamic range where linearity of the PAM is secured. Yet, in case of using an active antenna system in legacy massive MIMO system, since an antenna which is selected to transmit a broadcast channel operates only, a phenomenon of decreasing output power occurs, thereby decreasing cell coverage. Hence, the present invention proposes to secure sufficient beam gain by increasing a dynamic range of a PAM applied to a specific antenna port, which is used for transmitting a broadband channel such as a broadcast channel, and expand cell coverage of a broadcast channel in massive MIMO environment.

Figure 10:
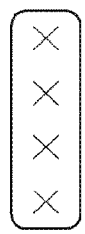
FIG. 10 is a diagram for an example of selecting an antenna for transmitting a broadcast channel according to embodiment of the present invention.
Figure 10:
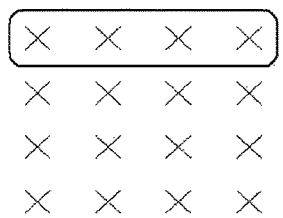
Figure 10:
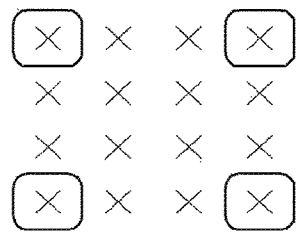

FIG. 10 is a diagram for an example of selecting an antenna for transmitting a broadcast channel according to embodiment of the present invention. In particular, referring to FIG. 10, antennas are grouped to transmit a broadcast channel in an antenna array. When the broadcast channel is transmitted, a control channel and a traffic channel, which are not grouped, can be used for transmitting the broadcast channel. Regarding this, it shall be explained in more detail in the following.

Figure 11:
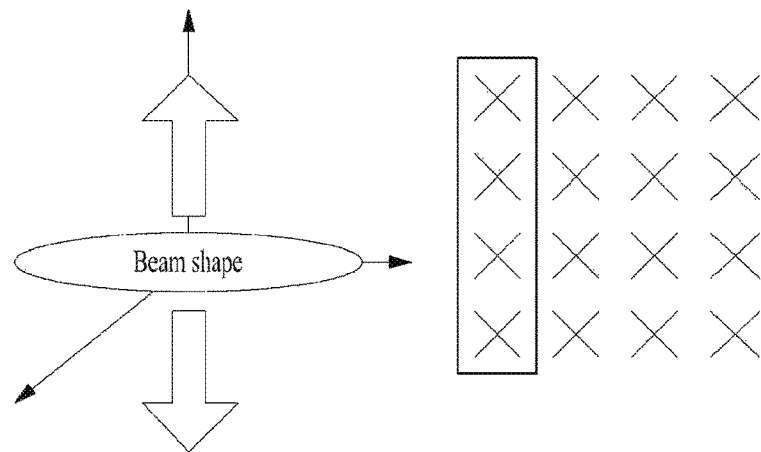
FIG. 11 is a diagram for a beam pattern for transmitting a broadcast channel according to embodiment of the present invention.

FIG. 11 is a diagram for a beam pattern for transmitting a broadcast channel according to embodiment of the present invention. In particular, FIG. 11 shows a case that antennas are selected according to FIG. 10(a).

Referring to FIG. 11, a broadcast channel is transmitted using vertically grouped 4 antenna ports and an antenna beam shape is outputted in a form of being horizontally spread due to up and down interaction between transmitted antennas. In this case, a beamforming is performed in up and down direction through antenna phase control of an active antenna system to expand coverage of whole broadcast channel. In particular, the beamforming is performed in up and down direction in a manner of changing a phase step by step to make a beam for the broadcast channel to be formed on the whole coverage.

Figure 12:
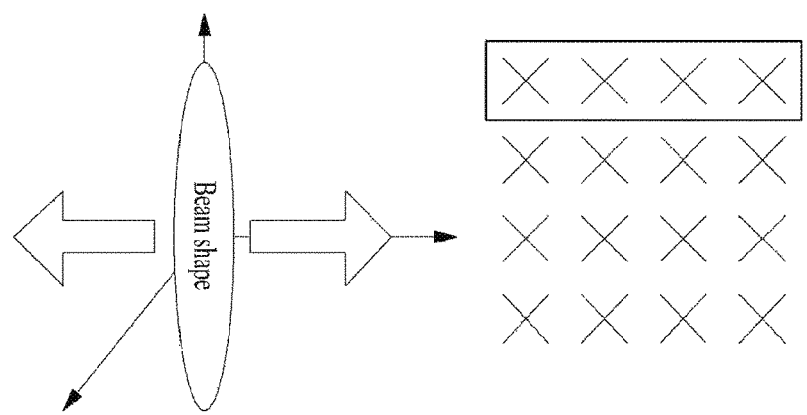
FIG. 12 is a different diagram for a beam pattern for transmitting a broadcast channel according to embodiment of the present invention.

FIG. 12 is a different diagram for a beam pattern for transmitting a broadcast channel according to embodiment of the present invention. In particular, FIG. 12 shows a case that antennas are selected according to FIG. 10(b).

Referring to FIG. 12, a broadcast channel is transmitted using horizontally grouped 4 antenna ports and an antenna beam shape is outputted in a form of being vertically spread due to left and right interaction between transmitted antennas. In this case, a beamforming is performed in left and right direction through antenna phase control of an active antenna system to expand coverage of whole broadcast channel. In particular, the beamforming is performed in left and right direction in a manner of changing a phase step by step to make a beam for the broadcast channel to be formed on the whole coverage.

Figure 13:
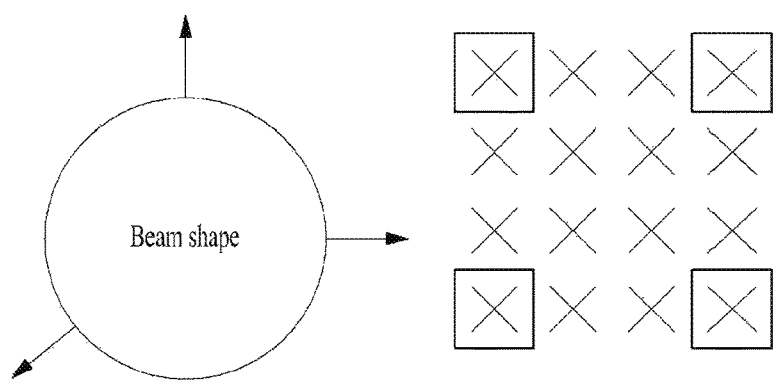
FIG. 13 is a further different diagram for a beam pattern for transmitting a broadcast channel according to embodiment of the present invention.

FIG. 13 is a further different diagram for a beam pattern for transmitting a broadcast channel according to embodiment of the present invention. In particular, FIG. 13 shows a case that antennas are selected according to FIG. 10(c).

Referring to FIG. 13, 4 antennas grouped together are apart from each other. Hence, this grouping corresponds to a structure that interaction between antennas is weakest. In this structure, a shape of a beam may have a sphere form similar to a shape of a beam transmitted by a single antenna. In this case, a broadcast channel is immediately transmitted without a separate phase control. Yet, in this case, there may exist a demerit in that coverage expansion for a broadcast channel is less compared to the case of FIG. 11 and FIG. 12.

In particular, in order to form a broad area beam in an antenna array structure, it may use 1D ULA antenna structure shown in FIG. 11 and FIG. 12 or it may select an outermost antenna shown in FIG. 13 to minimize interaction between antennas. If the aforementioned antenna is selected, a base station can expand coverage of a broadcast channel. In particular, if the three antenna selection schemes are periodically applied, it may be able to minimize a shadow zone to which a broadcast channel is not reached in a cell.

In particular, when the cases of FIG. 11 and FIG. 12 are assumed, if a broadcast channel is transmitted with a period of 10 ms, it may be necessary to have 40 ms to enable all UEs in a sector to receive the broadcast channel through elevation beamforming, horizontal beamforming and the like. In this case, the antenna selection of FIG. 11 can be applied at the time of first 40 ms and the antenna selection of FIG. 12 can be applied at the time of second 40 ms to minimize a shadow zone to which a broadcast channel is not reached in a cell.

As mentioned in the foregoing description, if a dynamic range of a PAM connected with all antennas is identical to each other, a shadow zone shown in FIG. 9 may occur. And, if a beamforming is not properly performed in 3D beamforming environment, since it is difficult to form a communication link between a base station and a UE, an amount of feedback information fed back to the base station by the UE and an amount of calculating the feedback may increase. If calibration of a 3D beam is not accurately performed and the beam does not reach the UE, the UE may fall into a null state.

In FIG. 10, the number of antennas, which are selected to transmit a broadcast channel, correspond to ¼ of the total number of antennas. Since transmission power is decreased as much as 4 times, it is necessary for the selected antennas to use a PAM of which a dynamic range is bigger as much as 4 times to obtain power identical to transmission power obtained from the whole of the antennas.

Figure 14:
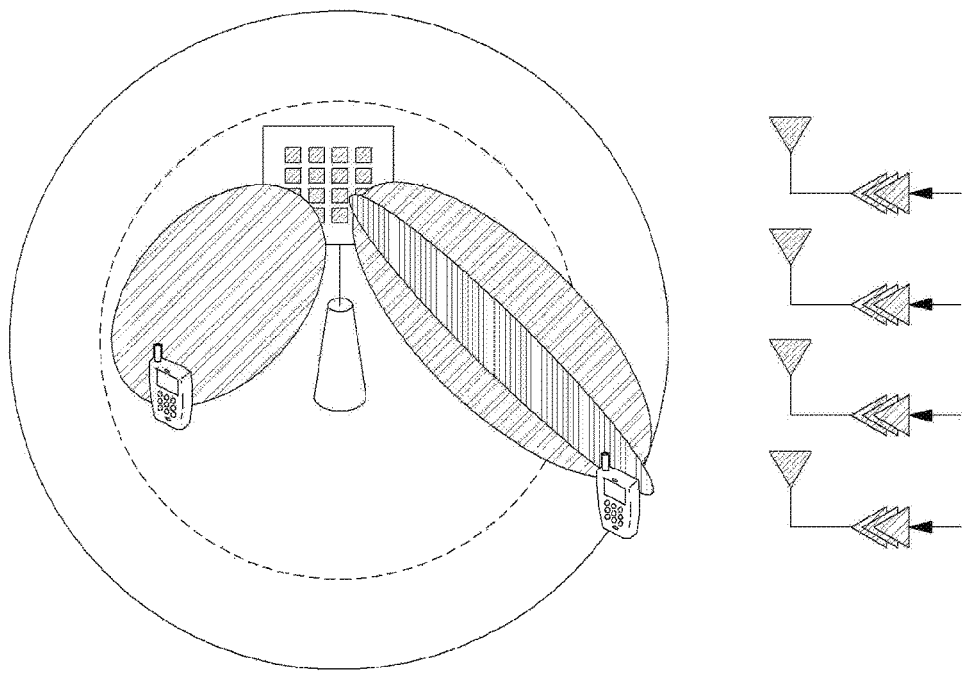
FIG. 14 is a diagram for an example of expanding cell coverage in a massive MIMO according to embodiment of the present invention.

FIG. 14 is a diagram for an example of expanding cell coverage in a massive MIMO according to embodiment of the present invention.

In particular, FIG. 14 shows an example of expanding coverage using a PAM of which a dynamic range is bigger than a dynamic range of the PAM shown in FIG. 7 to a grouped antenna port. If transmission power of the grouped antennas becomes identical to transmission power of the whole of the antennas according to the increase of the PAM, since a beam gain for broadcast channel transmission increases, a broadcast channel can be delivered to the cell boundary.

Figure 15:
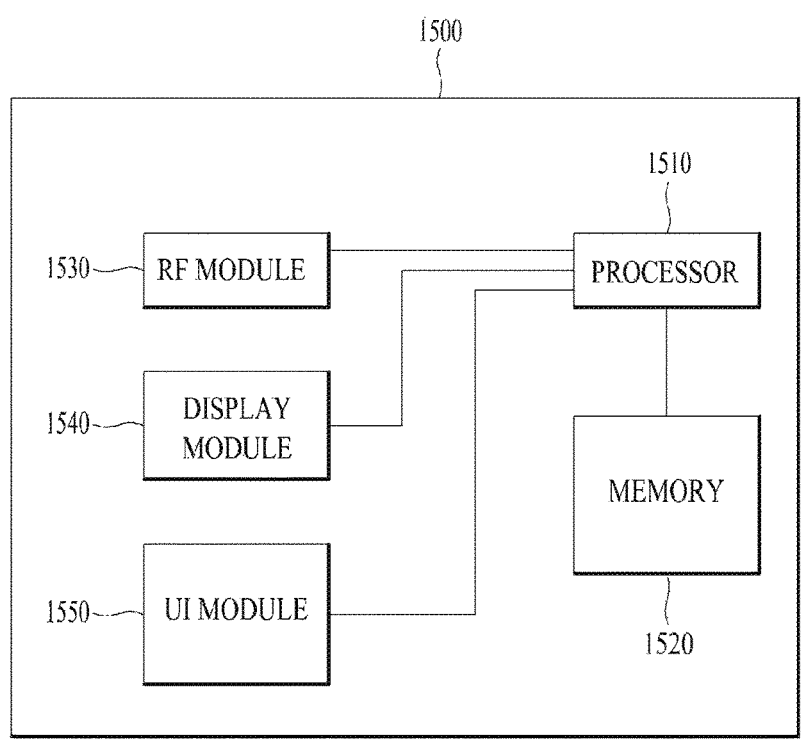
FIG. 15 is a block diagram of a communication apparatus according to an embodiment of the present invention.

FIG. 15 is a block diagram of a communication apparatus according to an embodiment of the present invention.

Referring to FIG. 15, a communication apparatus 1500 includes a processor 1510, a memory 1520, an RF module 1530, a display module 1540, and a User Interface (UI) module 1550.

The communication device 1500 is shown as having the configuration illustrated in FIG. 15, for the convenience of description. Some modules may be added to or omitted from the communication apparatus 1500. In addition, a module of the communication apparatus 1500 may be divided into more modules. The processor 1510 is configured to perform operations according to the embodiments of the present invention described before with reference to the drawings. Specifically, for detailed operations of the processor 1510, the descriptions of FIGS. 1 to 14 may be referred to.

The memory 1520 is connected to the processor 1510 and stores an Operating System (OS), applications, program codes, data, etc. The RF module 1530, which is connected to the processor 1510, upconverts a baseband signal to an RF signal or downconverts an RF signal to a baseband signal. For this purpose, the RF module 1530 performs digital-to-analog conversion, amplification, filtering, and frequency upconversion or performs these processes reversely. The display module 1540 is connected to the processor 1510 and displays various types of information. The display module 1540 may be configured as, not limited to, a known component such as a Liquid Crystal Display (LCD), a Light Emitting Diode (LED) display, and an Organic Light Emitting Diode (OLED) display. The UI module 1550 is connected to the processor 1510 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method of transmitting a broadcast channel through a massive MIMO (multiple-input multiple-output) antenna in a wireless communication system, the method performed by a base station (BS) and comprising:
    selecting broadcast channel-dedicated antenna elements from all antenna elements of the massive MIMO antenna;
    grouping the selected broadcast channel-dedicated antennas elements; and
    transmitting the broadcast channel by performing beamforming using the grouped broadcast channel-dedicated antenna elements,
    wherein power supplied to the grouped broadcast channel-dedicated antenna elements is greater than power supplied to non-selected antenna elements, and
    wherein the power supplied to the grouped broadcast channel-dedicated antenna elements becomes identical to a transmit power of all the antenna elements via a power amplifier module (PAM) having a larger dynamic range than a PAM of the non-selected antenna elements.

2. The method of claim 1, wherein the beamforming is performed in up and down directions if the grouped broadcast channel-dedicated antenna elements are vertically grouped.

3. The method of claim 2, wherein performing the beamforming in the up and down directions changes a beam angle stage-by-stage in the up and down directions for a predetermined period.

4. The method of claim 1, wherein the beamforming is performed in left and right directions if the grouped broadcast channel-dedicated antenna elements are horizontally grouped.

5. The method of claim 4, wherein performing the beamforming in the left and right directions changes a beam angle stage-by-stage in the left and right directions for a predetermined period.

6. The method of claim 1, wherein:
the grouped broadcast channel-dedicated antenna elements comprise a first broadcast channel-dedicated antenna group which is vertically grouped and a second broadcast channel-dedicated antenna group which is horizontally grouped; and
an antenna group for periodically transmitting the broadcast channel uses the first broadcast channel-dedicated antenna group and the second broadcast channel-dedicated antenna group.

7. A base station (BS) transmitting a broadcast channel through a massive MIMO (multiple-input multiple-output) antenna in a wireless communication system, the BS comprising:
a wireless communication module containing a massive MIMO (multiple-input multiple-output) antenna and configured to transmit and receive information; and
a processor configured to:
select broadcast channel-dedicated antenna elements from all antenna elements of the massive MIMO antenna;
group the selected broadcast channel-dedicated antennas elements; and
control the wireless communication module to transmit the broadcast channel by performing beamforming using the grouped broadcast channel-dedicated antenna elements,
wherein power supplied to the grouped broadcast channel-dedicated antenna elements is greater than power supplied to non-selected antenna elements, and
wherein the power supplied to the grouped broadcast channel-dedicated antenna elements becomes identical to a transmit power of all the antenna elements via a power amplifier module (PAM) having a larger dynamic range than a PAM of the non-selected antenna elements.

8. The BS of claim 7, the beamforming is performed in up and down directions if the grouped broadcast channel-dedicated antenna elements are vertically grouped.

9. The BS of claim 8, wherein performing the beamforming in the up and down directions changes a beam angle stage-by-stage in the up and down directions for a predetermined period.

10. The BS of claim 7, wherein the beamforming is performed in left and right directions if the grouped broadcast channel-dedicated antenna elements are horizontally grouped.

11. The BS of claim 10, wherein performing the beamforming in the left and right directions changes a beam angle stage-by-stage in the left and right directions for a predetermined period.

12. The BS of claim 7, wherein:
the grouped broadcast channel-dedicated antenna elements comprise a first broadcast channel-dedicated antenna group which is vertically grouped and a second broadcast channel-dedicated antenna group which is horizontally grouped; and
the processor is configured to periodically control the wireless communication module to transmit the broadcast channel by performing beamforming using the first broadcast channel-dedicated antenna group and the second broadcast channel-dedicated antenna group as an antenna group for transmitting the broadcast channel.

* * * * *